United States Patent
Pham et al.

(10) Patent No.: US 7,984,119 B2
(45) Date of Patent: Jul. 19, 2011

(54) TEMPLATE CONFIGURATION TOOL FOR APPLICATION SERVERS

(75) Inventors: Quang D. Pham, Sofia (BG); Ingo Zenz, Epfenbach (DE)

(73) Assignee: SAP AG, Walldorf (DE)

( * ) Notice: Subject to any disclaimer, the term of this patent is extended or adjusted under 35 U.S.C. 154(b) by 618 days.

(21) Appl. No.: 11/113,366

(22) Filed: Apr. 21, 2005

(65) Prior Publication Data
US 2006/0242626 A1  Oct. 26, 2006

(51) Int. Cl.
G06F 15/177 (2006.01)
G06F 15/173 (2006.01)

(52) U.S. Cl. ......... 709/220; 709/221; 709/222; 709/223

(58) Field of Classification Search .................. 717/120; 709/220, 222, 217, 201, 221, 223
See application file for complete search history.

(56) References Cited

U.S. PATENT DOCUMENTS

| | | | |
|---|---|---|---|
| 6,772,144 B2 * | 8/2004 | Brid et al. | 707/3 |
| 7,076,798 B2 * | 7/2006 | Chang et al. | 726/4 |
| 7,152,109 B2 * | 12/2006 | Suorsa et al. | 709/226 |
| 7,657,898 B2 * | 2/2010 | Sadiq | 719/330 |
| 2002/0095459 A1 * | 7/2002 | Laux et al. | 709/203 |
| 2002/0107954 A1 * | 8/2002 | Ferguson et al. | 709/224 |
| 2002/0156831 A1 * | 10/2002 | Suorsa et al. | 709/202 |
| 2002/0156894 A1 * | 10/2002 | Suorsa et al. | 709/226 |
| 2002/0161888 A1 * | 10/2002 | McGuire | 709/226 |
| 2002/0194584 A1 * | 12/2002 | Suorsa et al. | 717/176 |
| 2004/0060035 A1 * | 3/2004 | Ustaris | 717/100 |
| 2004/0068728 A1 * | 4/2004 | Blevins | 718/100 |
| 2004/0221261 A1 * | 11/2004 | Blevins | 717/107 |
| 2004/0226010 A1 * | 11/2004 | Suorsa | 717/174 |
| 2004/0255291 A1 * | 12/2004 | Sierer et al. | 717/174 |
| 2005/0251809 A1 * | 11/2005 | Gunduc et al. | 719/310 |
| 2006/0053272 A1 * | 3/2006 | Roth et al. | 713/1 |
| 2006/0092861 A1 * | 5/2006 | Corday et al. | 370/256 |
| 2008/0244617 A1 * | 10/2008 | Kukura et al. | 719/316 |
| 2009/0106731 A1 * | 4/2009 | Coulthard et al. | 717/101 |

* cited by examiner

Primary Examiner — Karen C Tang
(74) Attorney, Agent, or Firm — Schwegman, Lundberg & Woessner, P.A.

(57) ABSTRACT

A template configuration tool includes a template tool core and template processor plug-ins. The template processor plug-ins auto-configure components of an Application Server ("AS") instance based on component templates containing configuration information. The template tool core loads the components templates and the processor plug-ins and invokes functions of the template processor plug-ins to auto-configure the components of the AS instance.

8 Claims, 7 Drawing Sheets

TEMPLATE CONFIGURATION TOOL FOR APPLICATION SERVERS

TECHNICAL FIELD

This disclosure relates generally to installation and configuration of enterprise software, and in particular but not exclusively, relates to automated configuration of Application Servers instances deployed in an enterprise environment.

BACKGROUND INFORMATION

FIG. 1 is a block diagram illustrating an enterprise system 100 for deploying enterprise software on Application Server ("AS") instances 105. AS instances 105 may be web application servers, such as Web AS by SAP, .NET by Microsoft, or the like. AS instances 105 provide a framework to deploy a variety of business and presentation software packages for use in an enterprise environment. AS instances 105 are installed on one or more server nodes 110 and grouped into a cluster 115. The cluster 115 of AS instances 105 are provided to service work requests 120 received from client nodes 125. Cluster 115 may further include a message server node 130 supporting a message server 135, a database node 140 supporting a database 145, and a web dispatcher 150.

Each AS instance 105 may include one or more virtual machines ("VMs") 155 to interpret programs providing the presentation and business logic to service work requests 120. These VM machines may be Java VMs ("JVMs") compliant with the Java 2 Standard Edition ("J2SE") standard, the NET framework from Microsoft, or the like.

Web dispatcher 150 implements a load-balancing mechanism distributing work requests 120 from client nodes 125 among server nodes 110 within cluster 115. Web dispatcher 150 may be one of server nodes 110 having the task of dispatching work requests 120 among server nodes 110 of cluster 115 or a stand alone hardware node. Work requests 120 are processed by server nodes 110 and may subsequently be provided to database node 140. Database node 140 offers up the requested data to server nodes 110, which in turn process and format the results for display on client nodes 125. Each AS instance 105 may further include its own dispatcher mechanism to distribute work requests 120 assigned to it among its individual VMs 155.

Installation files 160 for installing AS instances 105 may be centrally stored within database 145. To deploy each AS instances 105, installation files 160 are copied from database node 140 to each server node 110 via a network link. Once copied, installation files 160 are installed generating a file system and establishing AS instances 105 on each server node 110. When freshly installed, each AS instance 105 is deployed with a default configuration installation for VMs 155 and the applications and services deployed therewith. AS instances 105 may be operated using the default configuration installation; however, this does not guarantee that all available resources will be utilized optimally or that AS instances 105 will function properly.

Typically, once each AS instance 105 is up and running with the default installation configuration, a user manually configures each AS instance 105. Manual configuration generally requires a sophisticated knowledge about the hardware and OS platforms, as well as, the tasks to be performed by each AS instance 105. The user configuring a default installation configuration may need to determine and input a large number of parameters unique to each AS instance 105 in a time consuming and error prone processes.

SUMMARY OF INVENTION

A template configuration tool is described herein. The template configuration tool includes a template tool core and template processor plug-ins. The template processor plug-ins auto-configure components of an Application Server ("AS") instance based on component templates each containing configuration information. The template tool core loads the components templates and the processor plug-ins and invokes functions of the template processor plug-ins to auto-configure the components of the AS instance based on the component templates.

The above attributes may be implemented using a computer program, a method, a system or apparatus, or any combination of computer programs, methods, or systems. These and other details of one or more embodiments of the invention are set forth in the accompanying drawings and in the description below.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 2:
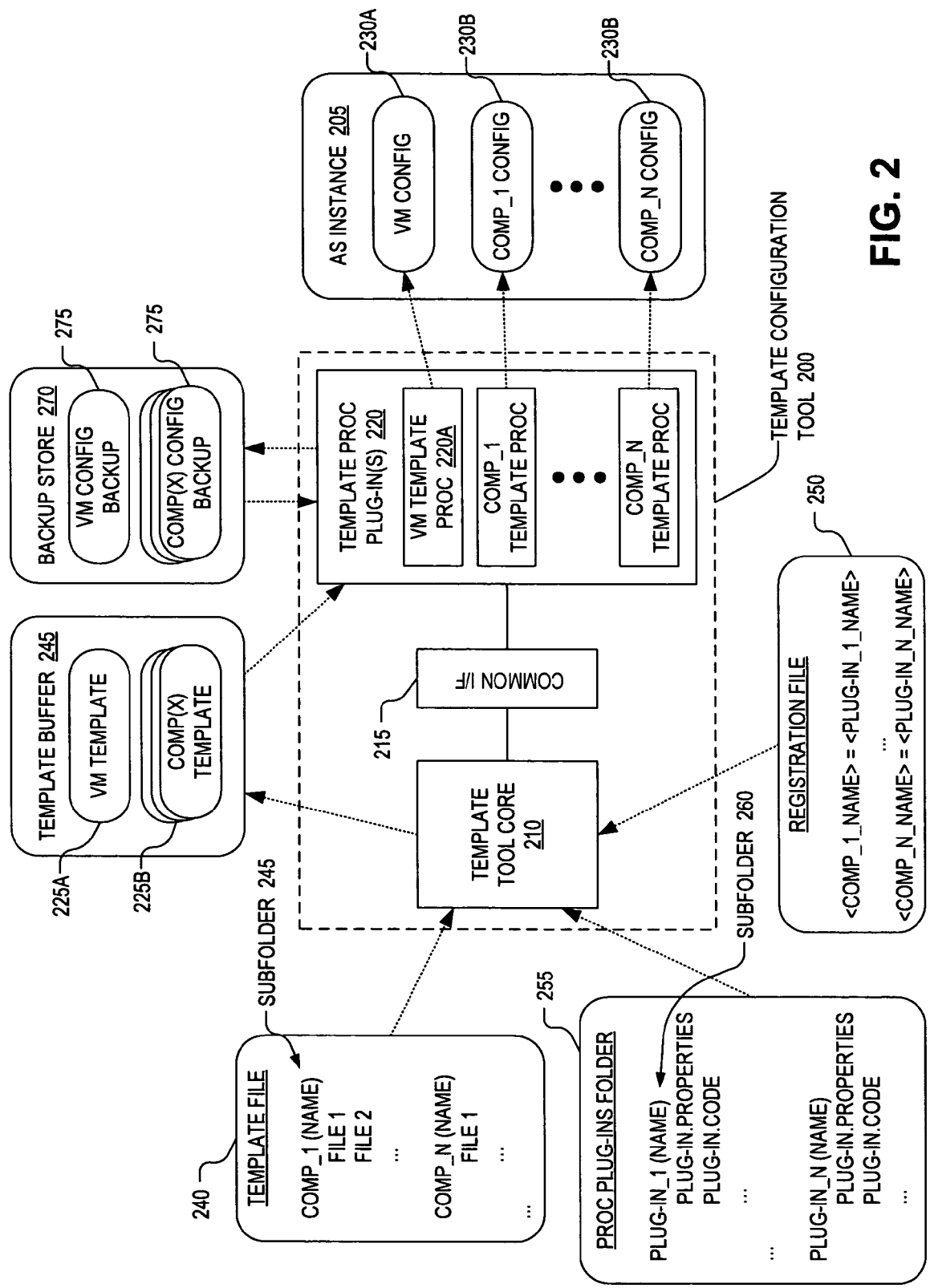
FIG. 2 is a block diagram illustrating a template configuration tool for automating the setup and configuration of an application server instance, in accordance with an embodiment of the invention.

FIG. 2 is a block diagram illustrating a template configuration tool 200 for automating the setup and configuration of an application server ("AS") instance 205, in accordance with an embodiment of the invention. The illustrated embodiment of template configuration tool 205 includes a template tool core 210, a common interface 215, and one or more template processor plug-ins 220.

Template processor plug-ins 220 are template engines which operate using component templates 225 (illustrated as including virtual machine ("VM") template 225A and other component templates 225B) to setup and configure installation configurations 230 (illustrated as including VM configuration 230A and other component configurations 230B) of AS instance 205. Component templates 225 may include software platform settings, hardware platform settings, and/or use-case settings which are applied to installation configurations 230 by template processor plug-ins 220.

Template configuration tool 200 may be thought of as a tool suite to automatically configure and performance tune-up a pre-existing installation configuration. Template configuration tool 200 may be applied to a default installation configuration that is initially deployed upon installing AS instance 205 for the first time on a server node, but has not yet been configured for operation on the particular software/hardware platform and/or use-case scenario. Subsequently, template configuration tool 200 may be ran to performance tune-up a pre-configured AS instance 205 installation that has degraded over time, to update a pre-configured AS instance 205 with new configuration settings, or after an application, service, or hardware update.

Each installation configuration 230 may represent installation files, folders, and settings related to various components of AS instance 205. For example, VM configuration 230A may represent the files, folders, and settings related to one or more VMs installed within AS instance 205. In one embodiment, these VMs may include Java VM ("JVMs") compliant with the Java 2 Standard Edition ("J2SE") standard or the Java 2 Enterprise Edition ("J2EE") standard. In one embodiment, these VMs may include JVMs compliant with the .NET framework by Microsoft. Installation configurations 230B may represent the files, folders, and settings related to other components of AS instance 205, such as, business logic components, presentation logic components, integration logic components (discussed in detail with respect to FIG. 6), or the like.

As illustrated, each component template 225 may correspond to a different component of AS instance 205 and is therefore used to automate the setup and configuration of existing installation configurations 230 related to each of the components. In one embodiment, component templates 225 may be provided by the vendors or developers of the various components of AS instance 205 who have the intimate knowledge to optimally setup and configure the components they develop. Embodiments of the invention do not specify the requirements or structure of each component template 225, but rather describe an overall framework for applying component templates 225 to the components of AS instance 205. The specifics of each component template 225 are left to the individual developers or providers of component templates 225. Similarly, the same developers may also generate and provide template processor plug-ins 220. Accordingly, a developer may bundle a template processor plug-in 220 with a corresponding component template 225 with their component for sale to end-users.

For example, the developer of the JVMs implemented within AS instance 205 may also create and provide VM template 225A and VM template processor 220A. The developer may create a number of different VM templates 225A optimized for configuring their JVM (or other component) on different software and/or hardware platforms and for different specialized use-case scenarios. The developer can then provide the end-user their JVM bundled with the appropriate VM template 225A and VM template processor 220A to automate the setup and configuration of the JVM.

While FIG. 2 illustrates a one-to-one correspondence between a component of AS instance 205, a template processor plug-in 220, and a component template 225, it should be appreciated that this need not be true in all cases. A single component template 225 may be used by a number of template processor plug-ins 220 to configure a number of components. For example, VM template 225A may be used by other components than just the VM component, which may require access to configuration settings of the VM. Correspondingly, multiple component templates 225 may be used to configure and setup different aspects of the same component.

Since component templates 225 and template processor plug-ins 220 are modular in nature, new and/or updated component templates 225 and template processor plug-ins 220 may be added to/removed from template configuration tool 200 at anytime. During operating template processor plug-ins 220 may be plug-into template configuration tool 200 in real-time using common interface 215. The functionality of template configuration tool 200 may be initiated, controlled, and monitored by template tool core 210 while access to each template process plug-in 220 is provided via common interface 215. By providing common interface 215 as an abstraction interface between template processor plug-ins 220 and template tool core 210, any number of template processor plug-ins 220 may be plugged in and out with ease. In one embodiment, template processor plug-ins 220 implement various methods/functions guided by component templates 225 to configure the current installation configurations of the various components of AS instance 205.

Template tool core 210 provides functionality for managing the general flow of the auto-configuration process. Some of this functionality includes generating a graphical user interface ("GUI") to enable a user to interact with template configuration tool 200 and set advance settings of the auto-configuration process, monitor the progression and results of the auto-configuration process, log the results of the auto-configuration process, as wells as perform other tasks described below.

Figure 3:
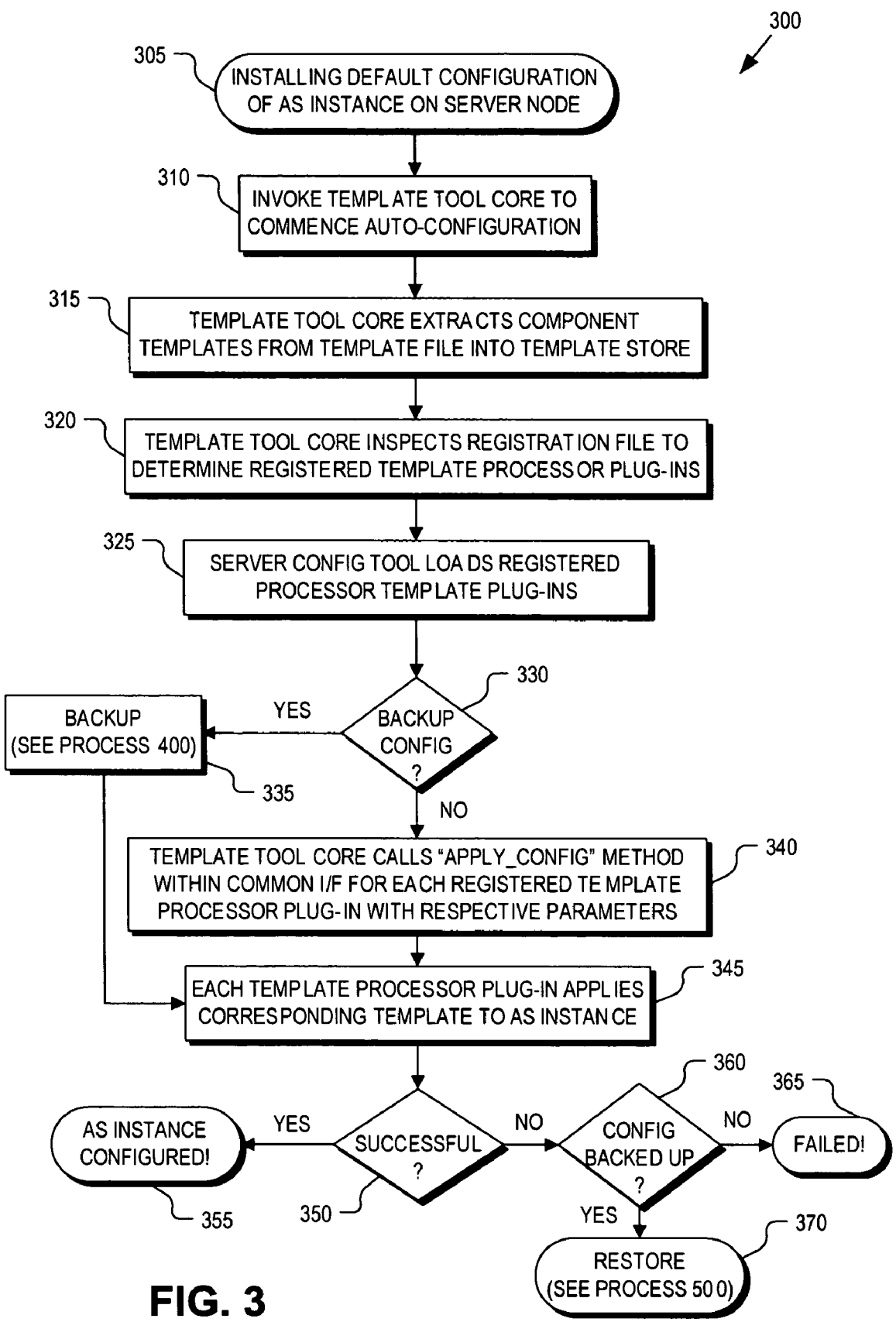
FIG. 3 is a flow chart illustrating a process to automate the setup and configuration of components of an application server instance using a template configuration tool, in accordance with an embodiment of the invention.

FIG. 3 is a flow chart illustrating an auto-configuration process 300 to automate the setup and configuration of the components of an AS instance 205 using template configuration tool 200, in accordance with an embodiment of the invention. Process 300 describes an auto-configuration of a default installation configuration; however, it is equally applicable to auto-configuration of any previously installed configuration.

Figure 1:
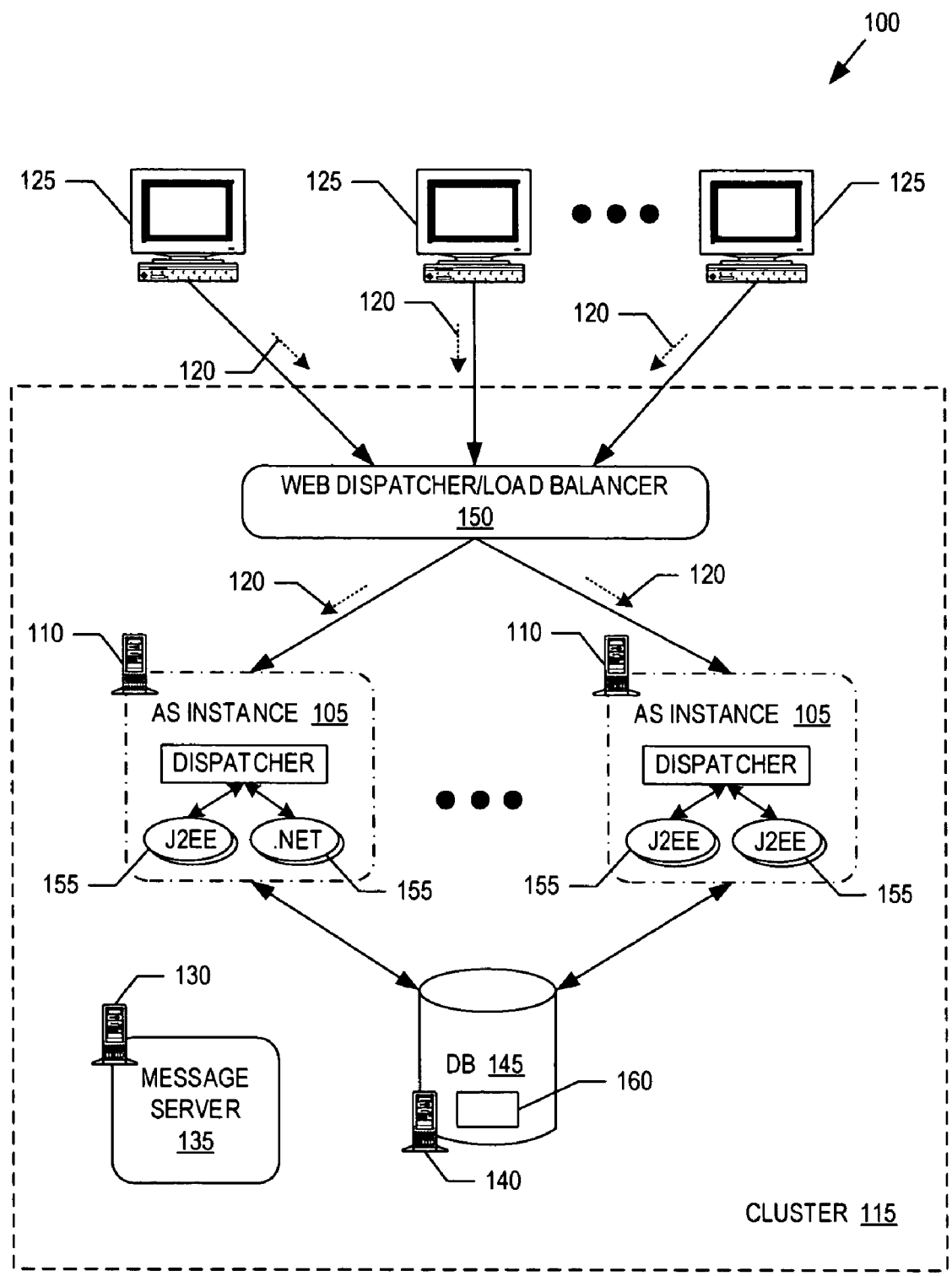
FIG. 1 is a block diagram illustrating an enterprise system for deploying enterprise software.

In a process block 305, AS instance 205 is installed onto a server node (e.g., one of server nodes 110 in FIG. 1) having a default installation configuration. In some cases, the default installation configuration of AS instance 205 may not operate at all without some level of configuration, while in other cases the default installation configuration may operate at some level, but at reduce capacity or with limited functionality. In a process block 310, template tool core 210 is invoked by a user to initiate the auto-configuration process on the default installation configuration of AS instance 205. Upon invocation of template tool core 210, one or more dialog boxes may be displayed providing the user an opportunity to select various user settings. In one embodiment, these user setting are configured to a default setting and therefore need only be manipulated if the user desires to deviate from these default settings. Some example user settings include indicating whether or not to backup the current installation configuration prior to commencement of the auto-configuration process, whether or not to apply local or global settings to the auto-configuration process, and the like. Global settings may including setting that are applied to all AS instances within a cluster, while local settings may include those setting that are applied to a single AS instance only.

In a process 315, the auto-configuration process begins when template tool core 210 extracts component templates 225 from a template file 240 and places component templates 225 into a template buffer 245. In one embodiment, template file 240 stores component templates 225 in a compressed format or archive file (e.g., zip, .rar, .gz, .tar, etc.) with the files associated with each component template 225 saved in subfolders 245 named with the component name. It should be appreciated that other techniques for archiving component templates 225 may be implemented with embodiments of the invention.

In a process block 320, template tool core 210 inspects a registration file 250 to determine which template processor plug-ins 220 are registered and therefore which template processor plug-ins 220 to load from a processor plug-in folder 255 and plug-in to common interface 215. The various different template processors 220 are initially stored in processor plug-in folder 255. In one embodiment, processor plug-in folder 255 stores files related to each template processor plug-in 220 in subfolders 260 labeled with the name of the corresponding component of AS instance 205. Each subfolder may contain the plug-in code (e.g., PLUG-IN.CODE) as well as a plug-in properties file (e.g., PLUG-IN.PROPERTIES). The properties file may specify the class or classes to be loaded when the particular template processor plug-in 220 is initialized and the class-path relative to subfolder 260. In a process block 325, template tool core 210 loads the registered template processor plug-ins 220.

Registration file 250 not only indicates to template tool core 210 which template processor plug-ins 220 to load but also provides a mapping between a particular template processor plug-in 220 and its corresponding component template 225. As illustrated, the name of the component template subfolder 245 is mapped to the name of the corresponding template processor plug-in subfolder 260. Registration file 250 enables template tool core 210 to match template processor plug-ins 220 with the proper component templates 225.

In a decision block 330, template tool core 210 determines whether to backup the current installation configuration of AS instance 205. In one embodiment, the default setting is to backup the installation configurations 230, which will be modified during the auto-configuration process by template processor plug-ins 220. However, as mentioned above a user may override this default setting. If template tool core 210 determines to backup at least a portion of AS instance 205, then process 300 continues to a process block 335. Process block 335 is described in detail in process 400 illustrated in FIG. 4. However, if template tool core 210 is set not to backup any installation configurations 230, then process 300 continues to a process block 340.

In process block 340, template tool core 210 invokes the "APPLY_CONFIG" method within common interface 215 for each registered template processor plug-in 220. In response, each template processor plug-in 220 invoked proceeds to configure its corresponding component of AS instance 230 based on its corresponding component template 225 (process block 345) and the settings/parameters passed from template tool core 210.

As discussed above, component templates 225 may include software platform dependent parameters, hardware platform dependent parameters, and/or use-case dependent parameters which are applied to installation configurations 230. Many of the parameters used to auto-configure may be extracted from the platform itself during the auto-configuration procedure by template processor plug-ins 220. The software platform dependent parameters enable template processor plug-ins 220 to auto-configure components of AS instance 205 based on the software environment present on the particular server node (e.g., OS, applications, drivers, etc.). Table 1 below lists some example software platform dependent parameters.

TABLE 1

| PARAMETER | DESCRIPTION |
| --- | --- |
| ${JAVA_HOME} | Path to the java installation folder |
| ${USR_SAP_DIR} | Path to the sap installation folder (e.g. /usr/sap) |
| ${SYSNAME} | Name of the system (e.g. C11) |
| ${INSTANCE_ID} | The 2 digit ID of the instance |
| ${INSTANCE_HOST} | The host name of the instance host |
| ${CENTRAL_SERVICES_INSTANCE_ID} | The 2 digit ID of the central instance |
| ${CENTRAL_SERVICES_HOST} | The host name of the central instance host |
| ${RDBMS_DRIVER_LOCATION} | List of paths to the jdbc driver jars |
| ${R3_ENV_YES_NO} | Add-on Installation: "YES", standalone "NO" |
| ${OS_NAME} | Name of the OS |
| ${OS_UNICODE} | Unicode enabled: "YES" otherwise "NO" |
| ${OS_BIT_LENGHT} | Address Bit length for the OS (e.g. 32, 64) |

The hardware platform dependent parameters enable template processor plug-ins 220 to auto-configure components of AS instance 205 based on the hardware environment of the server node (e.g., number of processors, available memory, network interface bandwidth, etc.). Table 2 below lists some example hardware platform dependent parameters.

TABLE 2

| PARAMETER | DESCRIPTION |
| --- | --- |
| ${CPU_COUNT} | The number of CPUs on the instance multiplied with the value of ${USAGE_FACTOR} |
| ${AVERAGE_CPU_SPEED} | The average CPU speed in MHz per CPU |
| ${AMOUNT_MEMORY} | The physical memory in MB available on this instance multiplied with the value of ${USAGE_FACTOR} (see below). This setting should be the basis for the calculation of the Max Heap Size |
| ${MAX_HEAP_SIZE} | The max heap size in MB configured for the VM running a server node |
| ${MAX_HEAP_SIZE_DISPATCHER} | The max heap size in MB configured for the VM running a dispatcher node |
| ${NUMBER_SERVER_NODES} | The number of virtual machines configured for the instance |
| ${USAGE_FACTOR} | A factor (0 . . . 1) which describes the usage of this instance. A factor of "1" means, that the machine is exclusively used for this instance (e.g. productive usage). A factor of 0.5 means for example, that the machine is only used 50% for this instance. On a developer PC, |

TABLE 2-continued

| PARAMETER | DESCRIPTION |
|---|---|
| | it might make sense to set a small factor |

The use-case dependent parameters enable template processor plug-ins 220 to auto-configure components of AS instance 205 based on the particular tasks that will be assigned to the server node (e.g., what type of business applications, presentation software, and integration services will be executed on the server node). Example use-case dependent parameters of a J2EE AS instance may include configuring an Internet-Inter ORB Protocol ("IIOP") service of a dispatcher to always run, configuring a P4 service to always run, or the like.

Component templates 225 may further include static parameters and/or dynamic parameters for auto-configuring AS instance 205. A static parameter is a parameter that is predetermined and may be listed in a component template 225 as a value, string, or the like. A dynamic parameter is a parameter that is dynamically determined during the auto-configuration process and may be listed within a component template 225 as an equation, relation, or arithmetic expression for determining the dynamic value based on variables automatically extracted from the software and/or hardware environments during the auto-configuration procedure. The structure of a dynamic parameter may be a combination of parameters, constants, simple operators, and brackets. The hardware platform dependent parameters listed in Table 2 are examples of parameters that can be dynamically determined. An example dynamic parameter for determining the maximum thread count within a VM may look something like "maxThreads=EXPR[200 min (10 max (${CPU_COUNT}*${AVERAGE_CPU_SPEED}/ (10*${NUMBER_SERVER_N ODES})))]." For this example, the maximum thread count is dynamically determined based on the CPU_COUNT, the AVERAGE_CPU_SPEED, and the NUMBER_SERVER_NODES automatically extracted from the platform during the auto-configuration procedure.

Returning to FIG. 3, if AS instance 205 is successfully configured (decision block 350), then the auto-configuration process is completed in a process block 355. However, if the auto-configuration process fails to validly auto-configure one or more components of AS instance 205 (decision block 350), then process 300 continues to a decision block 360. If the particular installation configuration 230 that failed to auto-configure was backed up in process block 335, then the backup installation configuration 230 corresponding to the failed component is restored to AS instance 205 in a process block 370. Process block 370 is described in detail in process 500 illustrated in FIG. 5. It should be noted that the entire installation configuration of AS instance 205 need not be restored. Rather, in some embodiments only the particular installation configuration 230 corresponding to the failed component is restored. However, in some failures the entire installation configuration of all the components of AS instance 205 may need to be restored if the failure is severe. If the failed installation configuration was not backed up, then the auto-configure process fails (process block 365).

Figure 4:
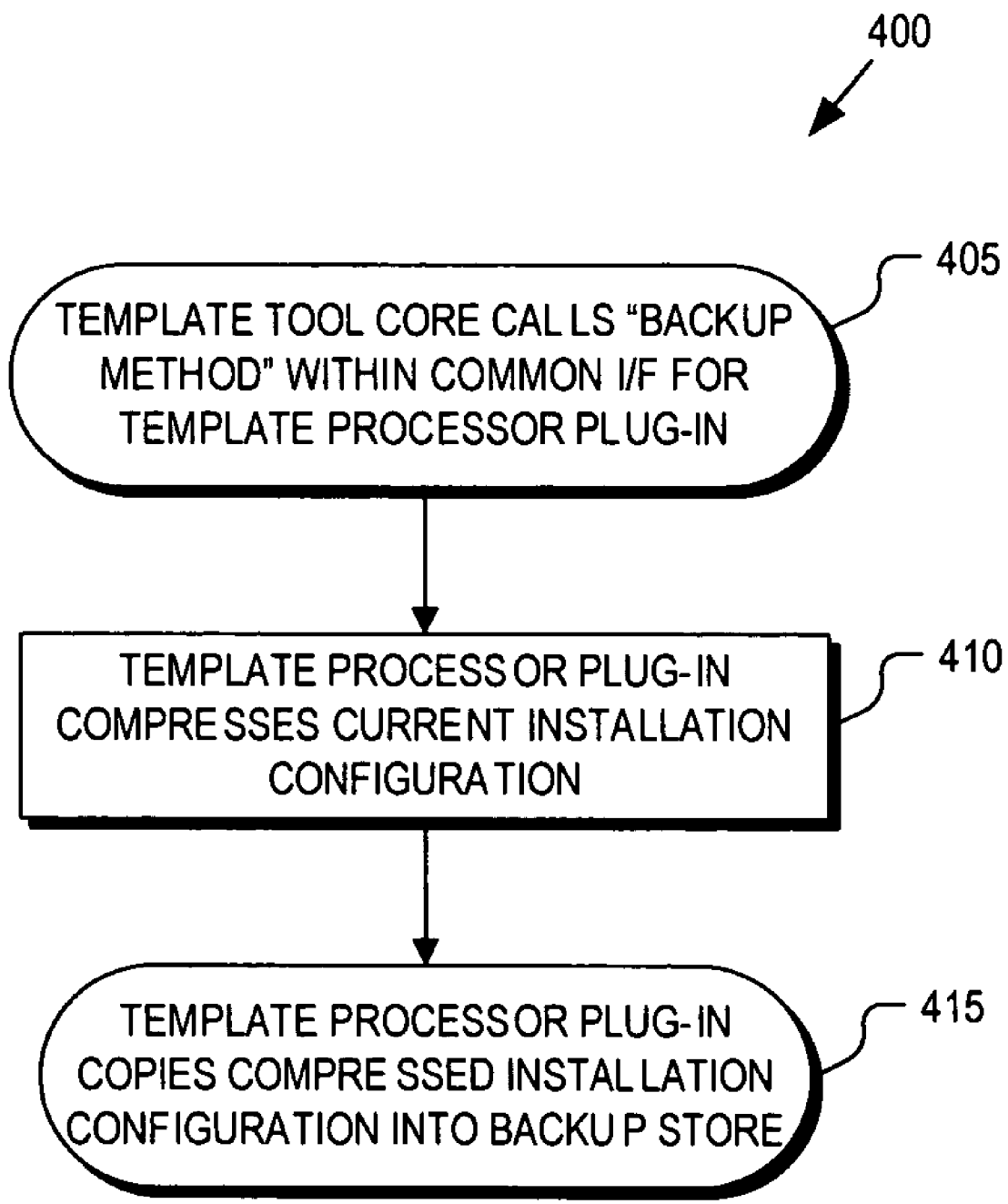
FIG. 4 is a flow chart illustrating a backup process for backing up components of a current installation configuration of an application server instance, in accordance with an embodiment of the invention.

FIG. 4 is a flow chart illustrating a process 400 for backing up installation configurations 230 corresponding to various components of AS instance 205, in accordance with an embodiment of the invention. In the illustrated embodiment, the backup of an installation configuration 230 commences when template tool core 210 invokes the "backup method" of a particular template processor plug-in 220 via common interface 215 (process block 405). In a process block 410, the invoked template processor plug-in 220 compresses the current installation configuration 230 of its corresponding component. In a process block 415, the invoked template processor plug-in 220 copies the compressed installation configuration 230 into a backup store 270 as backup configurations 275. Process 400 may be repeated for all installation configurations 230 to be auto-configured or process 400 may be repeated for those components of AS instance 205, which are selected by user input gathered by template tool core 210.

Figure 5:
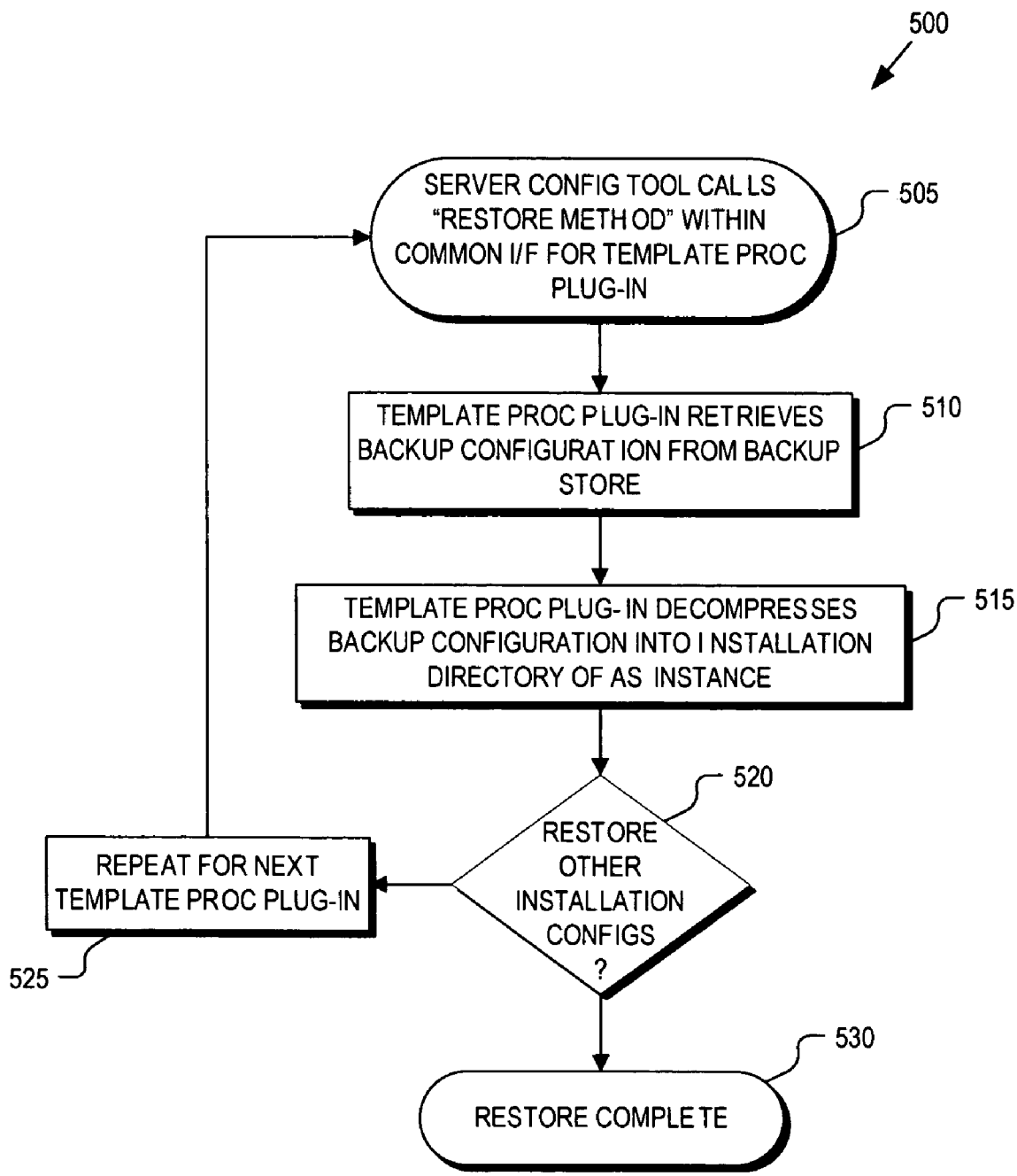
FIG. 5 is a flow chart illustrating a restore process for restoring installation configurations of various components of an application server instance, in accordance with an embodiment of the invention.

FIG. 5 is a flow chart illustrating a process 500 for restoring installation configurations 230 of various components of AS instance 205, in accordance with an embodiment of the invention. In the illustrated embodiment, restoration of an installation configuration 230 commences when template tool core 210 invokes the "restore method" of a particular template processor plug-in 220 via common interface 215 (process block 505). In a process block 510, the invoked template processor plug-in 220 retrieves its corresponding backup configuration 275 from backup store 270. In a process block 515, the invoked template processor plug-in 220 decompresses the backup configuration 275 into the original installation directories within AS instance 205 from which it originated. Process 500 may be repeated for all installation configurations 230 that have become corrupt or failed to auto-configure validly. Accordingly, if other installation configurations 230 need to be restored (decision block 520), then process 500 repeats itself for other template processor plug-ins 220 (process block 525). Otherwise, if no other installation configurations 230 need to be restored, then process 500 is completed in a process block 530. In one embodiment, a particular installation configuration 230 of a component may also be restored at the instigation of a user via template tool core 210.

Figure 6:
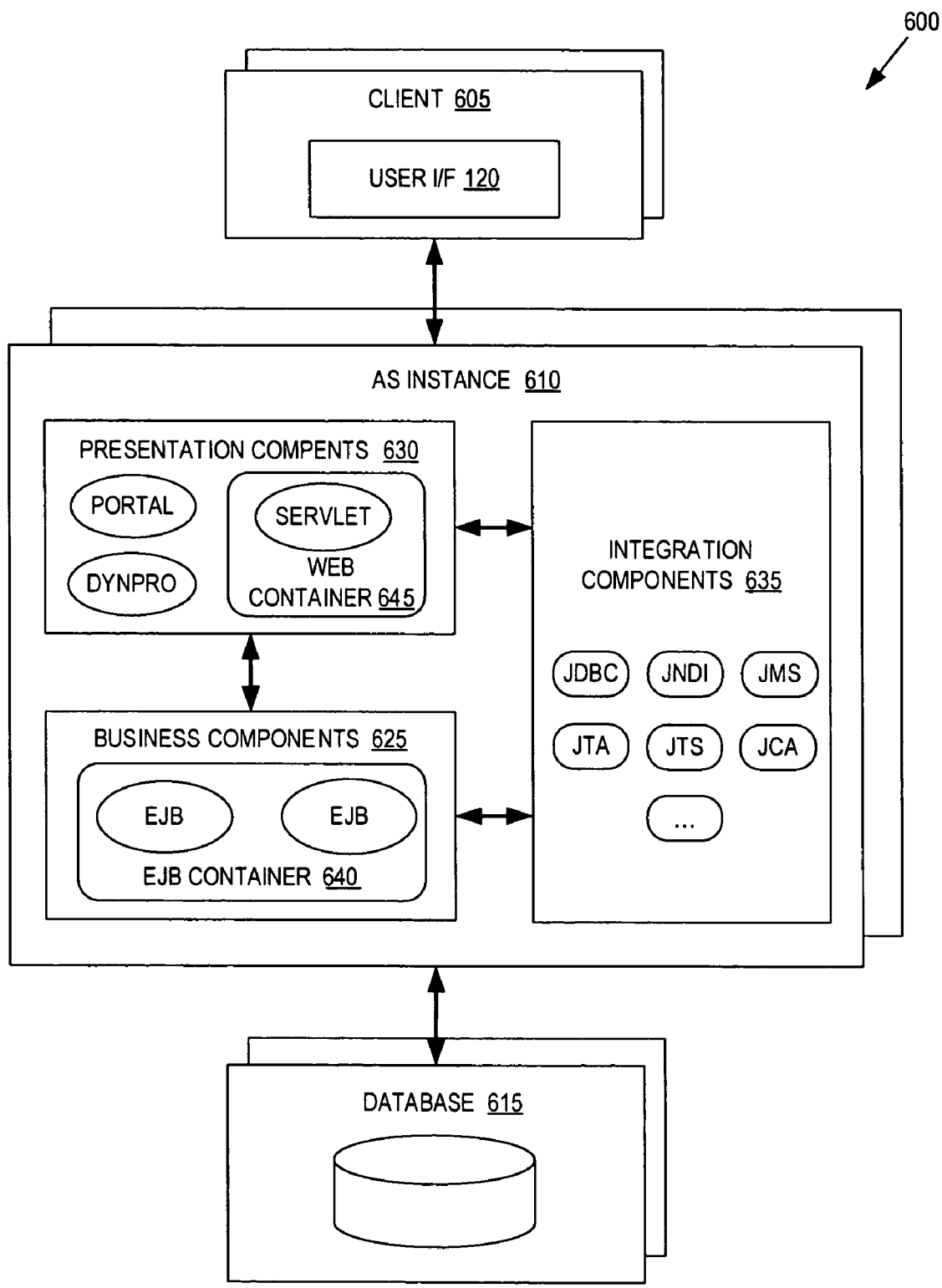
FIG. 6 is a block diagram illustrating various components of a demonstrative application server instance which may be automatically configured by a template configuration tool, in accordance with an embodiment of the invention.

FIG. 6 is a block diagram illustrating an enterprise system 600 including a demonstrative AS instance which may be auto-configured using template configuration tool 200, in accordance with an embodiment of the invention. Enterprise system 600 is a multi-tier architecture implemented using a variety of different technologies at each sub-layer, including those based on the Java 2 Platform, Enterprise Edition™ ("J2EE") standard (e.g., J2EE Specification, Version 1.4), the Microsoft NET standard, the Advanced Business Application Programming ("ABAP") standard developed by SAP AG, and the like.

The illustrated embodiment of enterprise system 600 includes one or more clients 605 communicatively coupled to one or more AS instances 610, which are in turn communicatively coupled to one or more database 615. A user interface 620 provides a graphical user interface ("GUI") to enable users of clients 605 to interact with databases 615 (e.g., submit queries, input data, etc.) through AS instances 610.

AS instances 610 may each include business components 625, presentation components 630, and integration components 635, which together form subcomponents of the Application Server (e.g., WebAS by SAP AG). Business components 625 provide the business logic of AS instance 610, enabling complex business processes to be implemented. In a J2EE environment, business components 625 may include one or more Enterprise JavaBean ("EJB") containers 640 each including one or more EJBs. The EJBs are Java based software modules that contain the actual business logic, while EJB container 640 encapsulates the EJBs in a Java based runtime environment that provides a host of common interfaces and services to the EJBs.

Presentation components 630 describe the specific manner in which the results of business components 625 are formatted for display on the user interface 620. The results may be formatted with aid of a web container 645 that supports both servlets and JavaServer Pages ("JSPs"). The servlets provide server-side processing to generate the GUI and the JSPs are extensions of the Java servlet technology for providing dynamic content within the GUI. In the example of WebAS, the servlets may include SAP Enterprise Portal, which provides a uniform and personalized access to various different back-end systems via a browser, Web Dynpro which uses JSPs to provide a development and runtime environment for Web applications, or other presentation logic.

Integration components 635 enable access to business functionalities from external resources. This is done using various services, connectors (middleware), communication protocols, and support for general data exchange formats (e.g., extensible markup language). For example, integration components 635 may contain support for the following services: Java Database Connectivity ("JDBC") Application Programming Interface ("API"), the Java Naming and Directory Interface ("JNDI"), the Java Messaging Service ("JMS"), the Java Transaction Service ("JTS"), the Java Transaction API ("JTA"), the J2EE Connector Architecture ("JCA"), and the like.

Template configuration tool 200 may be used to auto-configure any or all of the components of enterprise system 600 described above, including the business, presentation, and integration components. Furthermore, template configuration tool 200 may be used to auto-configure the underlying engines that operate these components. As discussed above, these underlying engines may be various types of JVMs, such as the J2EE engine. In fact, in some embodiments, template configuration tool 200 may be used to auto-configure applications within clients 605, various components of database 615, a dispatcher for distributing work requests between the AS instances 610 (e.g., web dispatch 150 in FIG. 1) or an internal dispatcher within each AS instance 610 (see FIG. 1), a message server (see FIG. 1), or the like.

Figure 7:
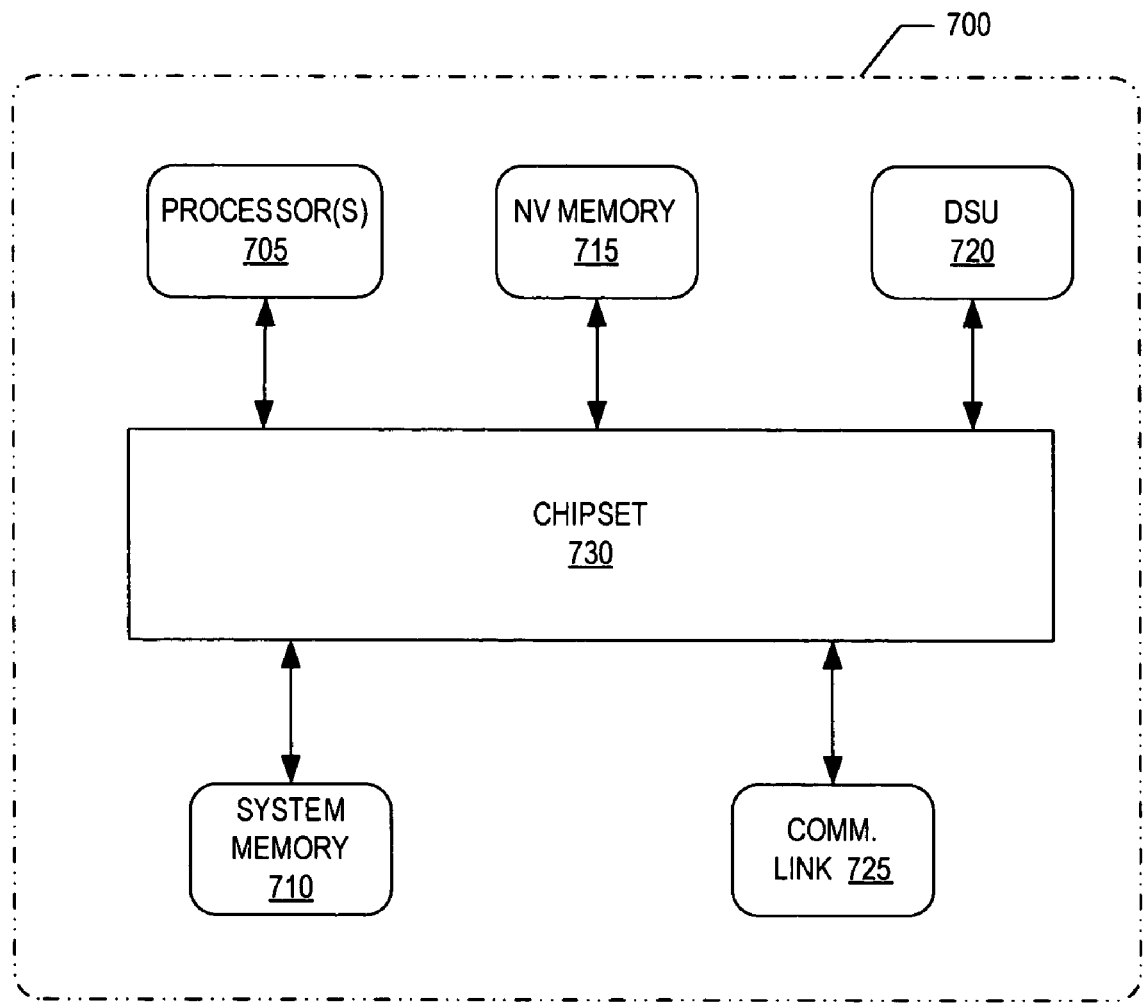
FIG. 7 is a block diagram illustrating a demonstrative enterprise environment for implementing embodiments of the invention.

FIG. 7 is a block diagram illustrating a demonstrative processing system 700 for executing AS instance 205 or AS instance 610, processes 300, 400, and 500, or implementing any of clients 605 or databases 615. The illustrated embodiment of processing system 700 includes one or more processors (or central processing units) 705, system memory 710, nonvolatile ("NV") memory 715, a DSU 720, a communication link 725, and a chipset 730. The illustrated processing system 700 may represent any computing system including a desktop computer, a notebook computer, a workstation, a handheld computer, a server, a blade server, or the like.

The elements of processing system 700 are interconnected as follows. Processor(s) 705 is communicatively coupled to system memory 710, NV memory 715, DSU 720, and communication link 725, via chipset 730 to send and to receive instructions or data thereto/therefrom. In one embodiment, NV memory 715 is a flash memory device. In other embodiments, NV memory 715 includes any one of read only memory ("ROM"), programmable ROM, erasable programmable ROM, electrically erasable programmable ROM, or the like. In one embodiment, system memory 710 includes random access memory ("RAM"), such as dynamic RAM ("DRAM"), synchronous DRAM, ("SDRAM"), double data rate SDRAM ("DDR SDRAM") static RAM ("SRAM"), and the like. DSU 720 represents any storage device for software data, applications, and/or operating systems, but will most typically be a nonvolatile storage device. DSU 720 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Although DSU 720 is illustrated as internal to processing system 700, DSU 720 may be externally coupled to processing system 700. Communication link 725 may couple processing system 700 to a network such that processing system 700 may communicate over the network with one or more other computers. Communication link 725 may include a modem, an Ethernet card, a Gigabit Ethernet card, Universal Serial Bus ("USB") port, a wireless network interface card, a fiber optic interface, or the like.

It should be appreciated that various other elements of processing system 700 have been excluded from FIG. 7 and this discussion for the purposes of clarity. For example, processing system 700 may further include a graphics card, additional DSUs, other persistent data storage devices (e.g., tape drive), and the like. Chipset 730 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 730. Correspondingly, processing system 700 may operate without one or more of the elements illustrated. For example, processing system 700 need not include DSU 720.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The processes explained above are described in terms of computer software and hardware. The techniques described may constitute machine-executable instructions embodied within a machine (e.g., computer) readable medium, that when executed by a machine will cause the machine to perform the operations described. Additionally, the processes may be embodied within hardware, such as an application specific integrated circuit ("ASIC") or the like. The order in which some or all of the process blocks appear in the processes should not be deemed limiting. Rather, one of ordinary skill in the art having the benefit of the present disclosure will understand that some of the process blocks may be executed in a variety of orders not illustrated.

The above description of illustrated embodiments of the invention, including what is described in the Abstract, is not intended to be exhaustive or to limit the invention to the precise forms disclosed. In some examples above, well-known structures, materials, or operations are not shown or described in detail to avoid obscuring certain aspects. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for reconfiguring a configuration of an application server instance, comprising:

installing, onto a server node, an application server instance and a template configuration tool, using one or more processors, the application server instance comprising a default installation configuration, and the template configuration tool comprising a template tool core and a set of registered template processor plug-ins;

applying, via the template configuration tool, the template tool core to the default installation configuration to initiate an automated configuration process for the application server instance, the automated configuration process comprising:

extracting, by the template tool core, a set of component templates from a template file into a template buffer, the template file associated with the template configuration tool, and the set of component templates corresponding to a set of application server instance components of the default installation configuration;

inspecting, by the template tool core, a registration file to determine the set of registered template processor plug-ins for the set of component templates and to correspond the set of registered template processor plug-ins with one or more components of the set of application server instance components of the default installation configuration, the registration file associated with the template configuration tool; and loading, by the template tool core, the set of registered template processor plug-ins to the application server instance; and reconfiguring the application server instance by configuring the one or more components of the set of components of the default installation configuration with the set of registered template processor plug-ins, the registration file comprising a mapping between each registered template processor plug-in of the set of registered template processor plug-ins and one or more component templates of the set of component templates from the template file;

saving a backup of the default installation configuration of the set of application server instance components prior to applying the template processor plug-ins; and restoring the backup of the default installation configuration of the set of application server instance components based on one of the template processor plug-ins failing to validly configure one of set of application server instance components.

2. The method of claim 1, wherein the default installation configuration is inoperable prior to the configuring of the application server instance.

3. The method of claim 1, wherein the default installation configuration has limited functionality prior to the configuring of the application server instance.

4. The method of claim 1, wherein the prior to the extracting, the template file stores the set of component templates in a format selected from the group consisting of a compressed format and an archive file.

5. A non-transitory machine readable storage medium having a set of machine-executable instructions stored thereon that when executed by a machine will cause the machine to perform operations of a method for reconfiguring a configuration of an application server instance, the method comprising:

installing, onto a server node, an application server instance and a template configuration tool, using one or more processors, the application server instance comprising a default installation configuration, and the template configuration tool comprising a template tool core and a set of registered template processor plug-ins;

applying, via the template configuration tool, the template tool core to the default installation configuration to initiate an automated configuration process for the application server instance, the automated configuration process comprising:

extracting, by the template tool core, a set of component templates from a template file into a template buffer, the template file associated with the template configuration tool, and the set of component templates corresponding to a set of application server instance components of the default installation configuration;

inspecting, by the template tool core, a registration file to determine a set of registered template processor plug-ins for the set of component templates and to correspond the set of registered template processor plug-ins with one or more components of the set of application server instance components of the default installation configuration, the registration file associated with the template configuration tool; and loading, by the template tool core, the set of registered template processor plug-ins to the application server instance; and reconfiguring the application server instance by configuring the one or more components of the set of components of the default installation configuration with the set of registered template processor plug-ins, the registration file comprising a mapping between each registered template processor plug-in of the set of registered template processor plug-ins and one or more component templates of the set of component templates from the template file, wherein a backup of the default installation configuration of the set of application server instance components is saved prior to applying the template processor plug-ins, and wherein the backup of the default installation configuration of the set of application server instance components is restored based on one of the template processor plug-ins failing to validly configure one of set of application server instance components.

6. The non-transitory machine readable storage medium of claim 5, wherein the default installation configuration is inoperable prior to the configuring of the application server instance.

7. The method of claim 1, wherein the default installation configuration has limited functionality prior to the configuring of the application server instance.

8. The method of claim 1, wherein the prior to the extracting, the template file stores the set of component templates in a format selected from the group consisting of a compressed format and an archive file.

* * * * *